United States Patent
Hayakawa et al.

[11] Patent Number: 5,897,091
[45] Date of Patent: Apr. 27, 1999

[54] AUTOMOTIVE SEAT SLIDE DEVICE

[75] Inventors: Hatuo Hayakawa; Shinichiro Kita; Kiyohiko Kamata; Noboru Takamura; Hidemasa Hirakui, all of Yokohama, Japan

[73] Assignee: Ohi Seisakusho Co., Ltd., Yokohama, Japan

[21] Appl. No.: 08/938,632

[22] Filed: Sep. 26, 1997

[30] Foreign Application Priority Data

Sep. 26, 1996 [JP] Japan ................................. 8-254405
Sep. 26, 1996 [JP] Japan ................................. 8-254414

[51] Int. Cl.⁶ ............................................. F16M 13/00
[52] U.S. Cl. ............................................. 248/430
[58] Field of Search ................................. 248/424, 429, 248/430

[56] References Cited

U.S. PATENT DOCUMENTS

| | | | |
|---|---|---|---|
| 4,556,263 | 12/1985 | Chevalier | 248/430 |
| 4,821,991 | 4/1989 | Aihara et al. | 248/430 |
| 4,901,421 | 2/1990 | Takarabe et al. | 248/430 |
| 5,046,698 | 9/1991 | Venier | 248/430 |
| 5,076,530 | 12/1991 | Dove et al. | 248/430 |
| 5,137,244 | 8/1992 | Negi | 248/430 |
| 5,192,045 | 3/1993 | Yamada et al. | 248/430 |
| 5,529,397 | 6/1996 | Yoshida | 384/47 |
| 5,641,145 | 6/1997 | Droulon et al. | 248/429 |
| 5,676,341 | 10/1997 | Tarusawa et al. | 248/430 |

FOREIGN PATENT DOCUMENTS 3-53331  5/1991  Japan.

*Primary Examiner*—Ramon O. Ramirez
*Assistant Examiner*—Robert Lipcsik
*Attorney, Agent, or Firm*—Foley & Lardner

[57] ABSTRACT

A rail unit comprises a fixed rail, a movable rail slidably engaged with the fixed rail and a locking mechanism for locking the movable rail relative to the fixed rail. In order to increase a mechanical strength of a given part of lower flanges of the movable rail where locking openings for the locking mechanism are formed, the given part is integrally formed at an upper end thereof with a raised portion, or the lower flanges of the movable rail are formed at mutually mating portions with depressed portions. When the movable rail and the fixed rail are subjected to a mutually pulled apart movement upon a vehicle collision of the like, the raised portion or the depression portions are brought into abutment with an inner surface of the fixed rail to suppress or at least minimize deformation of the rail unit.

4 Claims, 11 Drawing Sheets

(FRIOR ART)

(FRIOR ART)

AUTOMOTIVE SEAT SLIDE DEVICE

BACKGROUND OF THE INVENTION

1. Field of the Invention

The present invention relates in general to automotive seat slide devices, and more particularly to automotive seat slide devices of a type which is equipped with reinforcing means for assuring or keeping a locked connection between fixed and movable rails upon a vehicle collision or the like.

2. Description of the Prior Art

In automotive seat slide devices, there is a type which comprises two, viz., right and left rail units each including a fixed rail which is secured to a vehicle floor and a movable rail which is slidably engaged with the fixed rail and carries thereon a seat. At least one of the two rail units is equipped with a position lock mechanism for locking the movable rail at a desired fore-and-aft position relative to the fixed rail.

In order to clarify the task of the present invention, one conventional automotive seat slide device of the above-mentioned type will be described with reference to FIGS. 14 to 17 of the accompanying drawings. The conventional seat slide device shown in the drawings is disclosed in Japanese Utility Model First Provisional Publication 3-53331.

Referring to FIG. 15, there is shown one (viz., right one) of two rail units of the known seat slide device.

As shown in the drawing, the rail unit 1 comprises a fixed rail 3 which is secured to a floor of a motor vehicle, a movable rail 4 which is slidably engaged with the fixed rail 3 and a position lock mechanism 5 which can lock the movable rail 4 at a desired fore-and-aft position relative to the fixed rail 3.

The fixed rail 3 has a generally U-shaped cross section and has an axially extending slit 2 defined between two inward upper flanges 8a and 8b. One of side walls of the fixed rail 3 is formed with a plurality of aligned locking openings 17 which constitute part of the position lock mechanism 5, as will become apparent hereinafter. A bottom surface of the fixed rail 3 is denoted by numeral 7.

The movable rail 4 has a reversed T-shaped cross section and has a vertical wall portion 6 received in the slit 2 and two lower flanges 10a and 10b received in the fixed rail 3. As shown, the movable rail 4 is constructed of two metal plates which are combined in a back-to-back connecting manner. The movable rail 4 comprises the vertical wall portion 6 whose upper end is secured to a seat (not shown) and the two lower flanges 10a and 10b which extend in laterally opposite directions and have leading end portions 19a and 19b bent upward.

As is seen from FIGS. 15, 16 and 17, one of the lower flanges 10a and 10b of the movable rail 4, that is, the flange 10b, is formed with three aligned locking openings 18 each extending to the upwardly bent portion 19b. As is understood from FIG. 15, the lower flange 10b in which the locking openings 18 are formed is the flange which is directed toward the side wall of the fixed rail 3 where the aligned locking openings 17 are formed. The three locking openings 18 constitute part of the position lock mechanism 5, as will become apparent hereinafter.

As may be understood from FIG. 15, rollers (not shown) are disposed on the bottom surface 7 of the fixed rail 3, which rotatably support the two lower flanges 10a and 10b of the movable rail 4, and balls (not shown) are rotatably disposed in two chamber structures each being defined by one inward upper flange 8a or 8b of the fixed rail 3 and one lower flange 10a or 10b of the movable rail 4. With these rollers and balls, the sliding movement of the movable rail 4 relative to the fixed rail 3 is smoothly carried out.

The position lock mechanism 5 comprises a holder plate 12 which is welded to the vertical wall portion 6 of the movable rail 4. The holder plate 12 has a curled supporting portion 13 by which a control rod 14 is rotatably supported. A latch plate 15 having three pawls 16 is secured to the control rod 14 to rotate or pivot therewith.

As is understood from FIG. 15, when the movable rail 4 is slid to a position where the three locking openings 18 of the movable rail 4 are registered with three of the locking openings 17 of the fixed rail 3, the three pawls 16 of the latch plate 15 can enter the registered three pairs of locking openings 17 and 18 to achieve locking between the movable and fixed rails 4 and 3. That is, under this condition, the movable rail 4 is locked at the position relative to the fixed rail 3. Although not shown in the drawings, a biasing spring is incorporated with the control rod 14 to bias the same in a locking direction, that is, in a direction to bias the three pawls 16 of the latch plate 15 toward the locking openings 17 and 18. Thus, when the movable rail 4 is slid to such a registered position, the three pawls 16 of the latch plate 15 are automatically led into the three pairs of the locking openings 17 and 18 to achieve the locking of the movable rail 4.

In this locked condition, the pawls 16 of the latch plate 15 are engaged with not only the locking openings 17 of the fixed rail 3 but also the locking openings 18 of the movable rail 4, and thus a so-called center impelling supporting is effected by each pawl 16. Accordingly, much assured locking is obtained as compared with a locking of a type wherein the pawls 16 are engaged with only the locking openings 17 of the fixed rail 3.

However, the above-mentioned seat slide device 1 has the following drawback due to inherent construction of the lower flange 10b of the movable rail 4.

That is, as is understood from FIGS. 14 and 16, the upwardly bent portion 19b of the lower flange 10b of the movable rail 4 fails to have a robust structure due to provision of the three locking openings 18. More specifically, an apertured part 20 of the upwardly bent portion 19b where the three locking openings 18 are formed fails to have a robust structure. In fact, each locking opening 18 extends close to the top of the upwardly bent portion 19b, which reduces the effective thickness "H" of the portion 19b. Thus, when, due to a vehicle collision or the like, a great force is suddenly applied to the upwardly bent portion 19b through the three pawls 16 of the latch plate 15, such bent portion 19b tends to be severely deformed affecting the center impelling supporting by the pawls 16 by a certain degree. Although usage of a thicker or high rigidity metal plate as a material of the movable rail 4 can eliminate such drawback, weight and cost of the seat slide device are inevitably increased.

SUMMARY OF THE INVENTION

It is therefore an object of the present invention to provide an automotive seat slide device which is low in cost, light in weight and can assuredly keep a locked connection between movable and fixed rails even upon a vehicle collision or the like.

According to a first aspect of the present invention, there is provided a seat slide device which comprises a fixed rail having a substantially enclosed structure, the fixed rail including a bottom wall, side walls which extend upward from side ends of the bottom wall and two upper flanges which extend toward each other from upper ends of the side walls leaving therebetween an axially extending slit; a plurality of first aligned locking openings formed in one of the side walls of the fixed rail; a movable rail including a vertical wall portion and two lower flanges which extend in laterally opposite directions from a lower end of the vertical wall portion and have respective leading end portions bent upward, the movable rail being slidably engaged with the fixed rail in such a manner that the vertical wall portion is slidably put in the slit of the fixed rail having the two lower flanges slidably received in the enclosed structure of the fixed rail; at least one second locking opening formed in a given portion of one of the two lower flanges of the movable rail, the second locking opening extending into the corresponding upwardly bent portion and being registered with one of the first locking openings when the movable rail assumes a certain position relative to the fixed rail; a latch plate pivotally supported by the movable rail, the latch plate having at least one pawl which can be led into the registered first and second locking openings to lock the movable rail at the certain position relative to the fixed rail; and a reinforcing projected structure integrally possessed by at least one of the lower flanges of the movable rail, the reinforcing projected structure being brought into abutment with one of upper and lower surfaces of an interior of the enclosed structure of the fixed rail when the fixed and movable rails are mutually displaced in directions to be pulled apart from one another.

According to a second aspect of the present invention, there is provided a seat slide device which comprises a fixed rail having a substantially enclosed structure, the fixed rail including a bottom wall, side walls which extend upward from side ends of the bottom wall and two upper flanges which extend toward each other from upper ends of the side walls leaving therebetween an axially extending slit; a plurality of first aligned locking openings formed in one of the side walls of the fixed rail; a movable rail including a vertical wall portion and two lower flanges which extend in laterally opposite directions from a lower end of the vertical wall portion and have respective leading end portions bent upward, the movable rail being slidably engaged with the fixed rail in such a manner that the vertical wall portion is slidably put in the slit of the fixed rail having the two lower flanges slidably received in the enclosed structure of the fixed rail; at least one second locking opening formed in a given portion of one of the two lower flanges of the movable rail, the second locking opening extending into the corresponding upwardly bent portion and being registered with one of the first locking openings when the movable rail assumes a certain position relative to the fixed rail; a latch plate pivotally supported by the movable rail, the latch plate having at least one pawl which can be led into the registered first and second locking openings to lock the movable rail at the certain position relative to the fixed rail; a plurality of rollers rotatably put on the bottom wall of the fixed rail to hold thereon the two lower flanges of the movable rail; a plurality of balls rotatably received in a space defined between each of the two lower flanges of the movable rail and each of the two upper flanges of the fixed rail; front and rear roller/ball retainers by which the rollers and balls are parted into two groups, each retainer being slidably disposed between the fixed and movable rails; and a reinforcing projected structure integrally possessed by the given portion of the movable rail, the reinforcing projected structure including a raised portion which is integrally formed on a top of the upwardly bent portion of the given portion of the lower flange of the movable rail, the raised portion being brought into abutment with an upper surface of an interior of the enclosed structure of the fixed rail when the fixed and movable rails are mutually displaced in directions to be pulled apart from one another.

According to a third aspect of the present invention, there is provided a seat slide device which comprises a fixed rail having a substantially enclosed structure, the fixed rail including a bottom wall, side walls which extend upward from side ends of the bottom wall and two upper flanges which extend toward each other from upper ends of the side walls leaving therebetween an axially extending slit; a plurality of first aligned locking openings formed in one of the side walls of the fixed rail; a movable rail including a vertical wall portion and two lower flanges which extend in laterally opposite directions from a lower end of the vertical wall portion and have respective leading end portions bent upward, the movable rail being slidably engaged with the fixed rail in such a manner that the vertical wall portion is slidably put in the slit of the fixed rail having the two lower flanges slidably received in the enclosed structure of the fixed rail; at least one second locking opening formed in a given portion of one of the two lower flanges of the movable rail, the second locking opening extending into the corresponding upwardly bent portion and being registered with one of the first locking openings when the movable rail assumes a certain position relative to the fixed rail; a latch plate pivotally supported by the movable rail, the latch plate having at least one pawl which can be led into the registered first and second locking openings to lock the movable rail at the certain position relative to the fixed rail; a plurality of rollers rotatably put on the bottom wall of the fixed rail to hold thereon the two lower flanges of the movable rail; a plurality of balls rotatably received in a space defined between each of the two lower flanges of the movable rail and each of the two upper flanges of the fixed rail; front and rear roller/ball retainers by which the rollers and balls are parted into two groups, each retainer being slidably disposed between the fixed and movable rails; and a reinforcing projected structure including a depressed portion possessed by the given portion of one of the two lower flanges of the movable rail and another depressed portion possessed by a corresponding portion of the other lower flange of the movable rail, the reinforcing projected structure being brought into abutment with a lower surface of an interior of the enclosed structure of the fixed rail when the fixed and movable rails are mutually displaced in directions to be pulled apart from one another.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
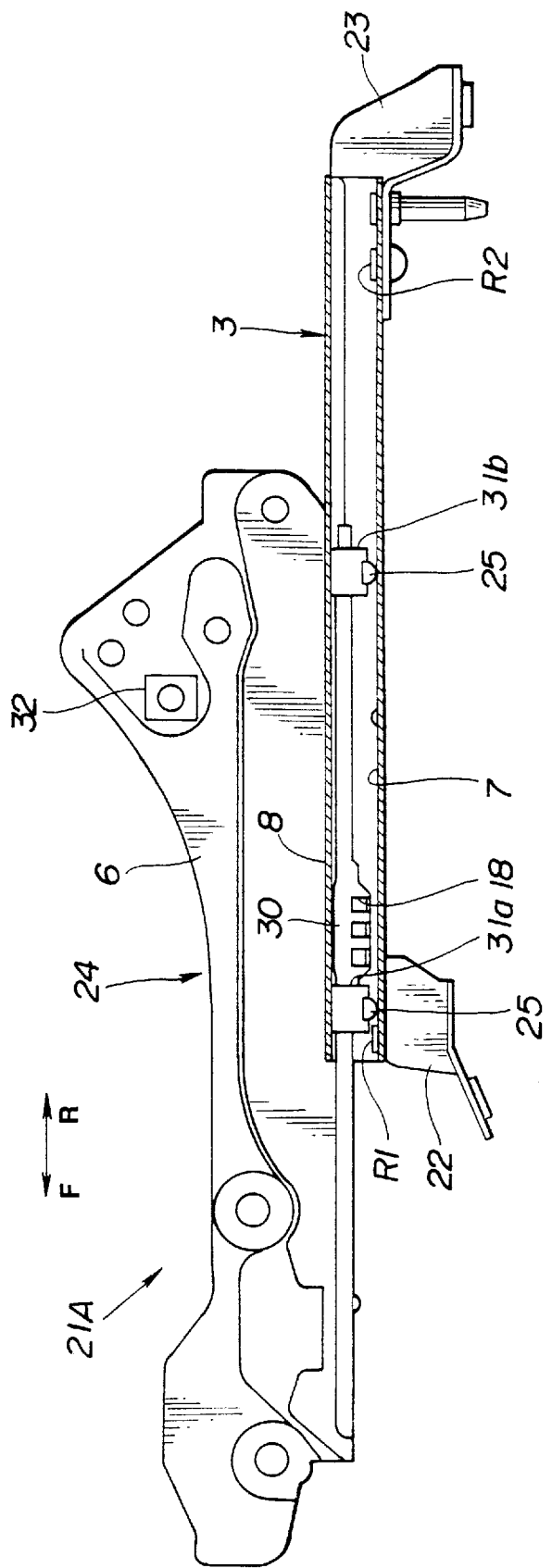
FIG. 1 is a side view of a seat slide device of a first embodiment of the present invention in a condition wherein a movable rail assumes a frontmost position relative to a fixed rail.

Referring to FIGS. 1 to 8, particularly FIG. 1, there is shown a right rail unit 21A of an automotive seat slide device which is a first embodiment of the present invention.

In the following, substantially the same parts as those of the above-mentioned conventional seat slide device 1 of FIGS. 14 to 17 are denoted by the same numerals.

In the drawings, forward and rearward directions with respect to the rail unit 21A are indicated by arrows "F" and "R".

As shown in FIG. 1, the rail unit 21A comprises a fixed rail 3 which is mounted to a vehicle floor (not shown) through front and rear mounting brackets 22 and 23. The front and rear mounting brackets 22 and 23 are secured to the fixed rail 3 through respective rivets R1 and R2.

A movable rail 24 carrying thereon a seat (not shown) is slidably engaged with the fixed rail 3.

A position lock mechanism 5 (see FIG. 6) is further provided, which can lock the movable rail 24 at a desired fore-and-aft position relative to the fixed rail 3.

Figure 6:
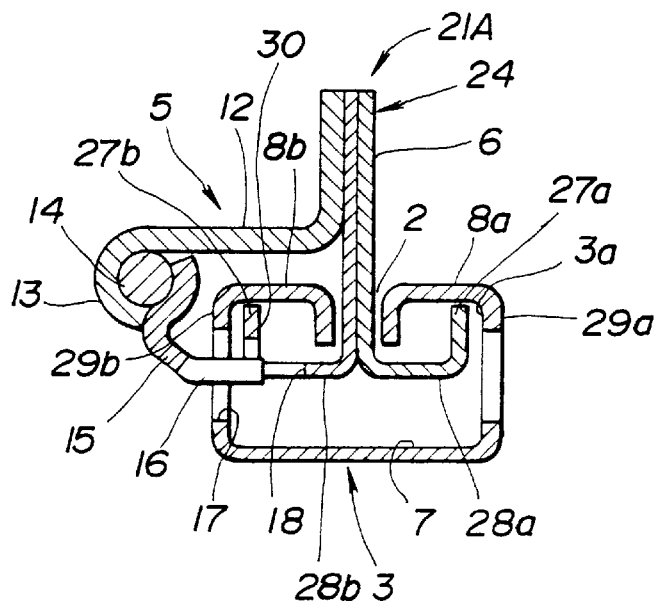
FIG. 6 is a sectional view taken along the line A—A of FIG. 5.

As is seen from FIG. 6, the fixed rail 3 has a generally U-shaped cross section and has an axially extending slit 2 defined between two inward upper flanges 8a and 8b. One of side walls 29a and 29b, that is, the side wall 29b of the fixed rail 3 is formed with a plurality of aligned locking openings 17 which constitute part of the position lock mechanism 5, as will become apparent hereinafter. A bottom surface of the fixed rail 3 is denoted by numeral 7.

The movable rail 24 has a reversed T-shaped cross section and has a vertical wall portion 6 received in the slit 2 and two lower flanges 28a and 28b received in the fixed rail 3. The movable rail 24 is constructed of two metal plates which are combined in a back-to-back connecting manner. The movable rail 24 comprises the vertical wall portion 6 whose upper end is secured to the seat (not shown) and the two lower flanges 28a and 28b which extend in laterally opposite directions and have leading end portions 27a and 27b bent upward.

As is seen from FIG. 1, the vertical wall portion 6 has at a rear part thereof a nut 32 to which a seat belt anchor (not shown) is detachably connected.

As is seen from FIG. 6, the flange 28b of the movable rail 24, which is directed toward the side wall of the fixed rail 3 where the aligned locking openings 17 are formed, is formed with three aligned locking openings 18 each extending to the upwardly bent portion. The three locking openings 18 constitute part of the position lock mechanism 5 as will become apparent hereinafter.

Figure 2:
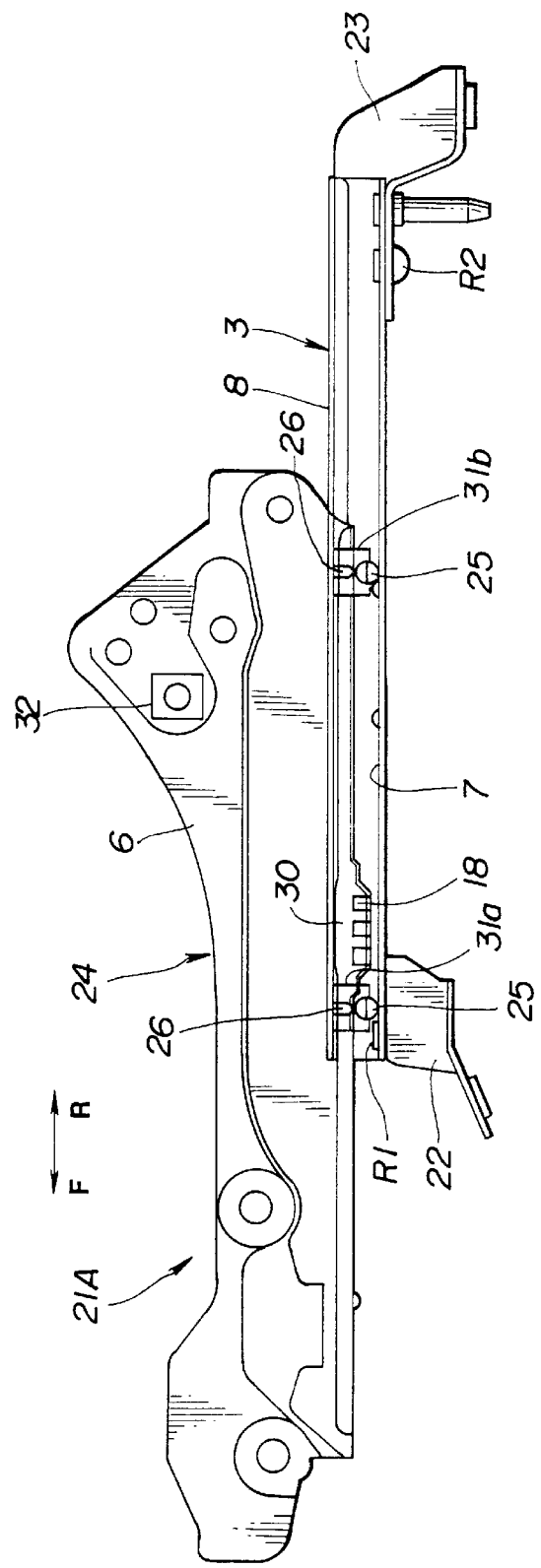
FIG. 2 is a view similar to FIG. 1, but a view with some parts removed.

As may be understood from FIGS. 2 and 6, rollers 25 (see FIG. 2) are disposed on the bottom surface 7 to support the two lower flanges 28a and 28b of the movable rail 24, and balls 26 (see FIG. 2) are rotatably disposed in two chamber structures each being defined by one inward upper flanges 8a or 8b of the fixed rail 3 and one lower flange 28a or 28b of the movable rail 24.

Figure 4:
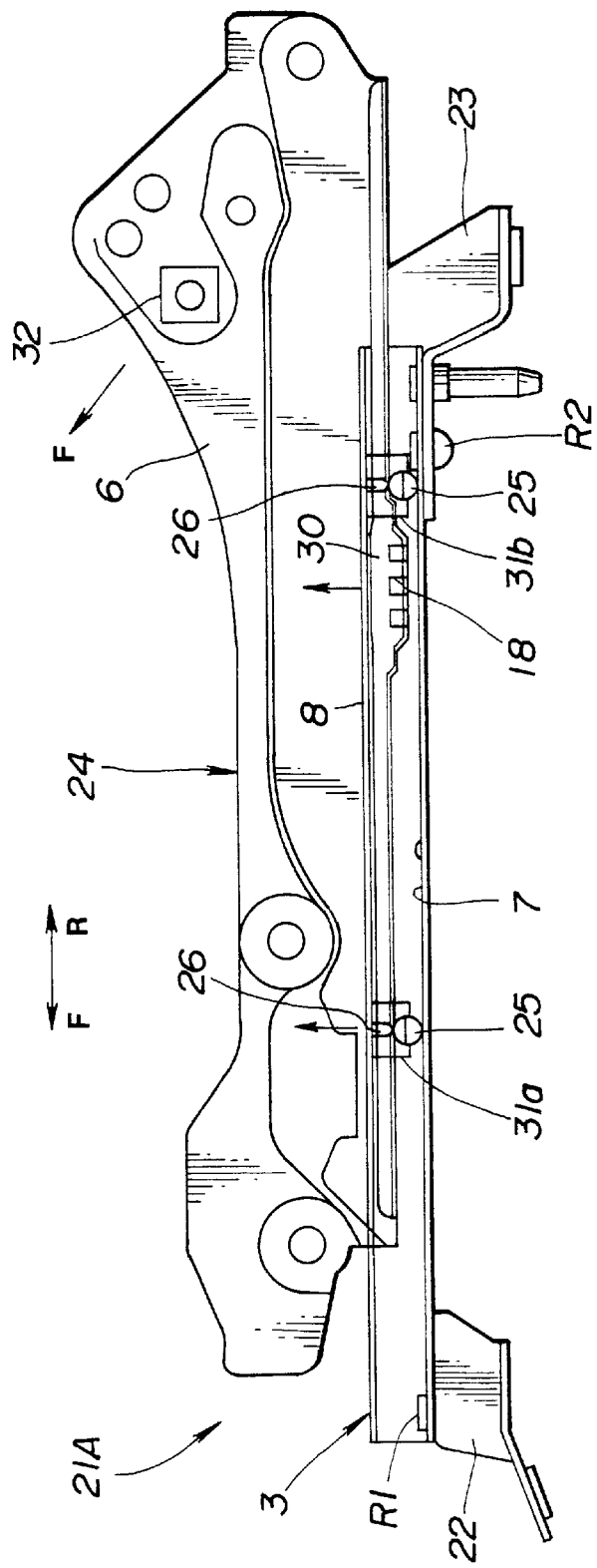
FIG. 4 is a view similar to FIG. 3, but a view with some parts removed.

As is seen from FIGS. 2 and 4, the rollers 25 and balls 26 are parted into front and rear groups each being operatively retained in a front or rear roller/ball retainer 31a or 31b which is slidably disposed between the fixed and movable rails 3 and 24. With these rollers 25 and balls 26, the sliding movement of the movable rail 24 relative to the fixed rail 3 is smoothly carried out.

Figure 3:
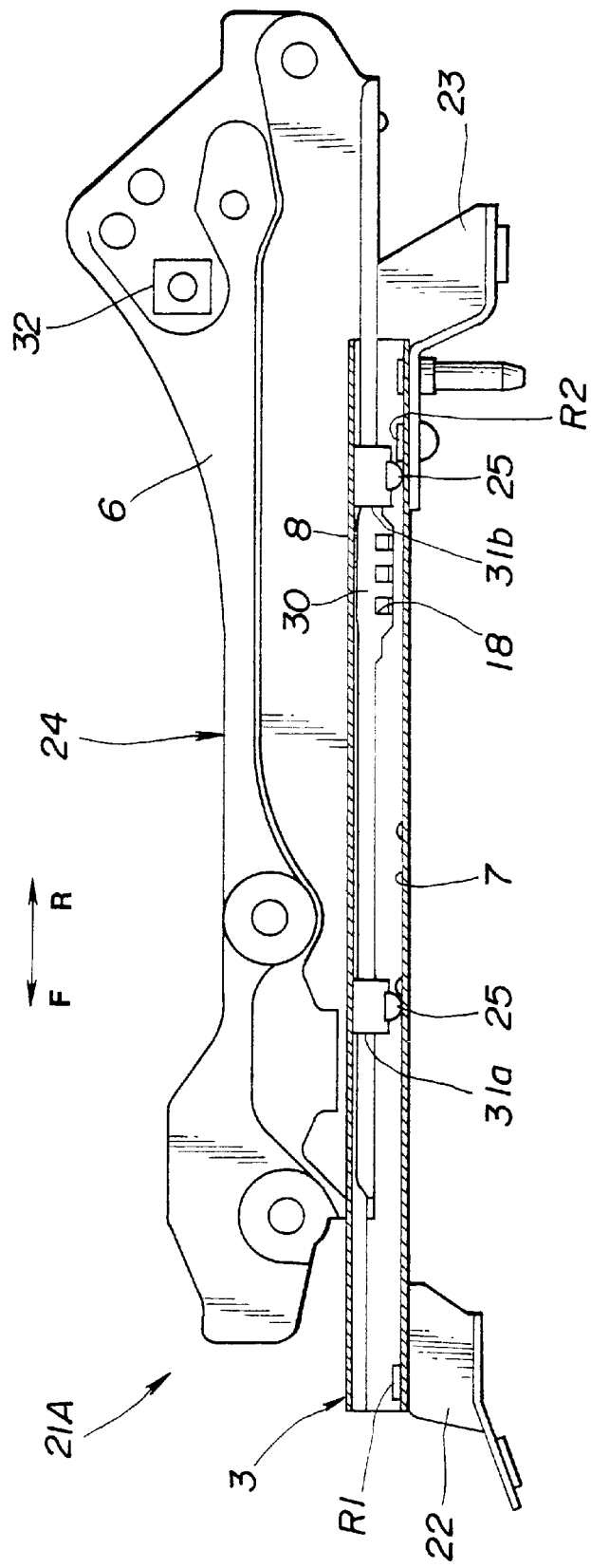
FIG. 3 is a view similar to FIG. 1, but showing a condition wherein the movable rail assumes a rearmost position the fixed to the fixed rail.

As is seen from FIGS. 1 and 3, projected heads of the rivets R1 and R2 are arranged to serve as stoppers for the rollers 25.

As is seen from FIG. 6, the position lock mechanism 5 comprises a holder plate 12 which is welded to the vertical wall portion 6 of the movable rail 24. The holder plate 12 has a curled supporting portion 13 by which a control rod 14 is rotatably supported. A latch plate 15 having three pawls 16 is secured to the control rod 14 to rotate or pivot therewith.

As is understood from FIG. 6, when the movable rail 24 is slid to a position where the three locking openings 18 of the movable rail 24 are registered with three of the locking openings 17 of the fixed rail 3, the three pawls 16 of the latch plate 15 can enter the registered three pairs of locking openings 17 and 18 to effect locking between the movable and fixed rails 24 and 3. That is, under this condition, the movable rail 24 is locked at the position relative to the fixed rail 3. Although not shown in the drawings, a biasing spring is incorporated with the control rod 14 to bias the same in a locking direction, that is, in a direction to bias the latch plate 15 toward the locking openings 17 and 18. Thus, when the movable rail 24 is slid to such a registered position, the three pawls 16 of the latch plate 15 are automatically led into the three pairs of locking openings 17 and 17 to achieve the locking of the movable rail 24.

In this locked condition, the pawls 16 of the latch plate 15 are engaged with not only the locking openings 17 of the fixed rail 3 but also the locking openings 18 of the movable rail 24, and thus a so-called center impelling supporting is effected by each of the pawls 16.

In the first embodiment 24 of the present invention, the following measure is employed for increasing the mechanical strength of an apertured part 30 of the upwardly bent portion 27b of the lower flange 28b of the movable rail 24 where the three locking openings 18 are formed.

Figure 5:
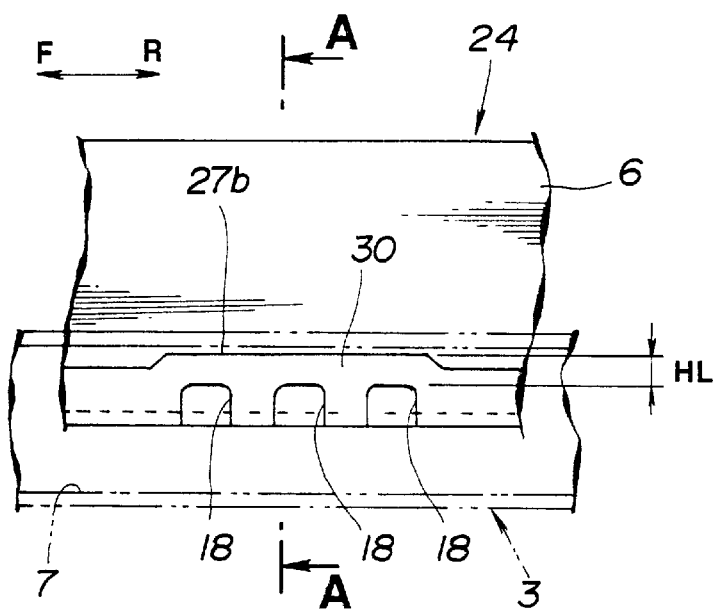
FIG. 5 is an enlarged side view of an essential portion of the seat slide device shown in FIG. 1.
Figure 7:
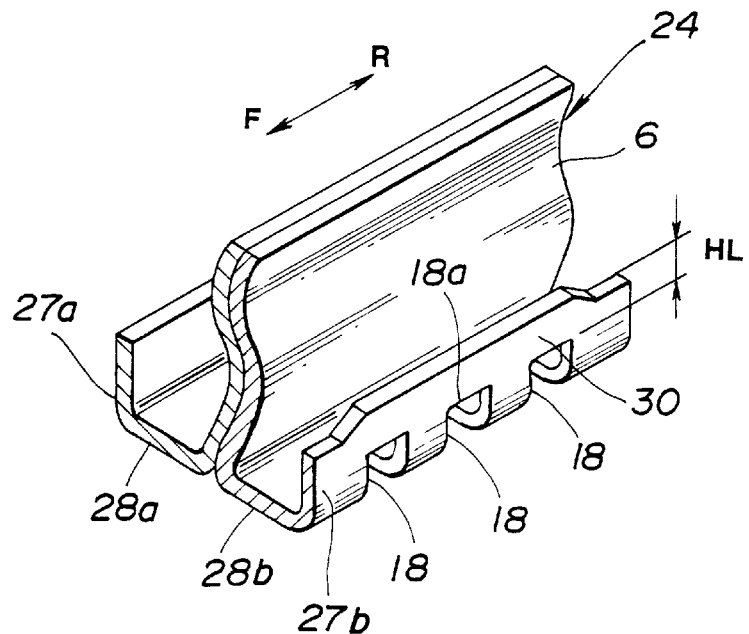
FIG. 7 is a perspective but partial view of the movable rail.
Figure 8:
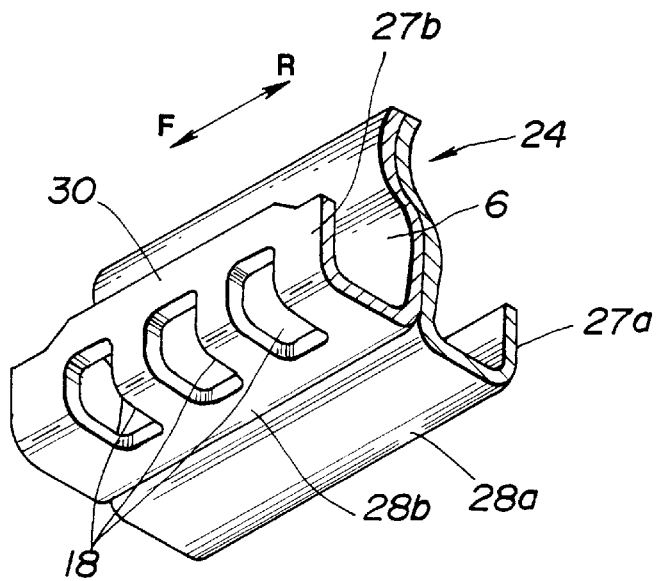
FIG. 8 is a perspective but partial view of the movable rail taken from a different position.

As is seen from FIGS. 5, 7 and 8, the apertured part 30 of the upwardly bent portion 27b where the three locking openings 18 are formed is constructed to have an increased effective thickness "HL". That is, the upwardly bent portion 27b of the lower flange 28b is somewhat raised at the apertured part 30 to increase the thickness of a bridge part which is defined between each locking opening 18 and the raised upper ridge of the upwardly bent portion 27b . With this construction, the apertured part 30 has a robust structure, and thus the rail unit 21A of the seat slide device of this first embodiment can exhibit a sufficient resistance against the marked force produced upon a vehicle collision or the like.

If desired, the other upwardly bent portion 27a (see FIG. 6) may have such a robust structure. That is, a corresponding part of the upwardly bent portion 27a may have a raised upper ridge.

In the following, advantages of the rail unit 21A of the first embodiment will be described.

First, as is described hereinabove, due to the robust structure of the apertured part 30, undesired deformation of the apertured part 30 upon a vehicle collision, which tends to occur in the conventional seat slide device, is suppressed or at least minimized. Due to provision of the enlarged apertured part 30, the modulus of section of the movable rail 24 is increased.

Second, due to provision of the raised upper ridge of the apertured part 30, the upwardly bent portion 27b of the movable rail 24 can instantly abut against the upper flange 8b of the fixed rail 3 upon lifting of the seat caused by a vehicle collision or the like. The instant abutment can minimize the possibility of undesired separation of the movable rail 24 from the fixed rail 3.

Third, due to provision of the front and rear holders 31a and 31b by which the rollers 25 and balls 26 are grouped into two, the weight of the seat is stably held by the fixed rail 3. Furthermore, even if, as is seen from FIG. 4, due to a vehicle collision or the like, a force "F" is produced in a direction to raise up a rear portion of the movable rail 24, the force "F" is evenly supported by the two groups of the rollers 25 and balls 26.

Fifth, since the robust structure of the movable rail 24 is easily achieved by only providing the apertured part 30 with a raised upper ridge, the rail unit 21A of this embodiment can be produced low in cost and light in weight.

Figure 9:
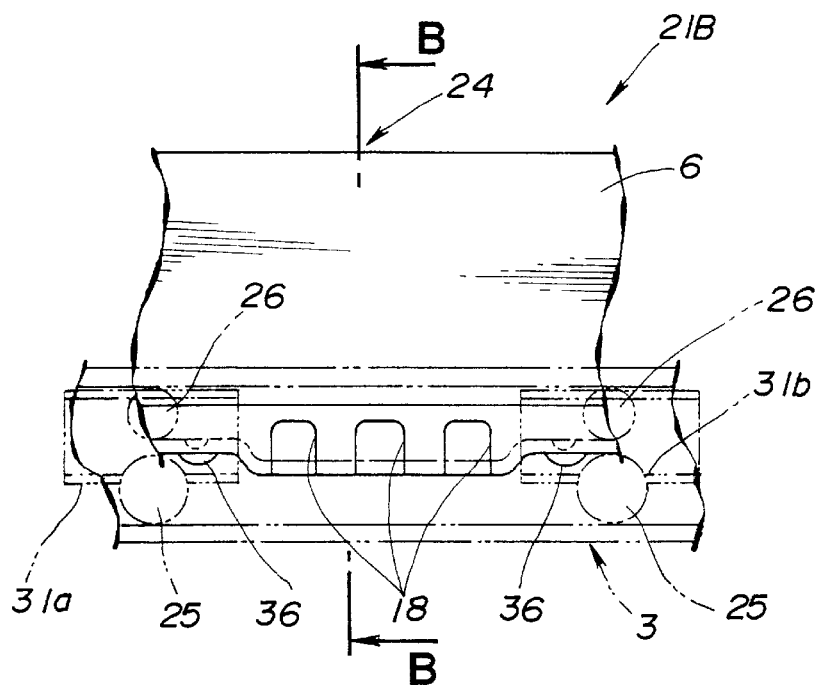
FIG. 9 is a view similar to FIG. 5, but showing a seat slide device of a second embodiment of the present invention.
Figure 10:
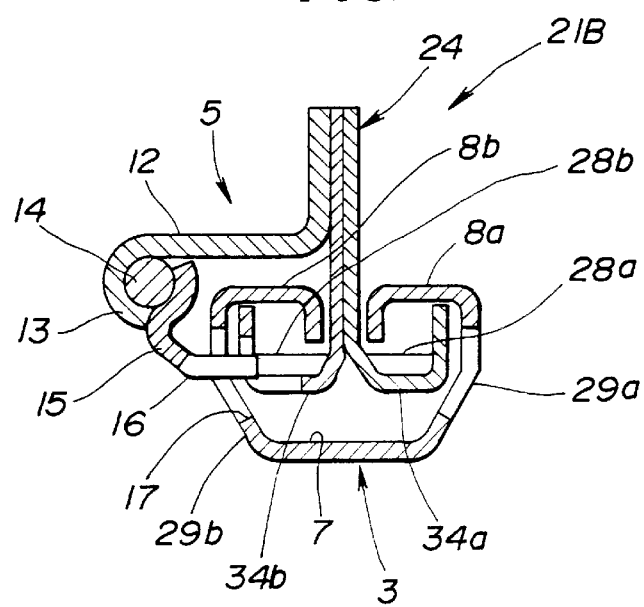
FIG. 10 is a sectional view taken along the line B—B of FIG. 9.
Figure 11:
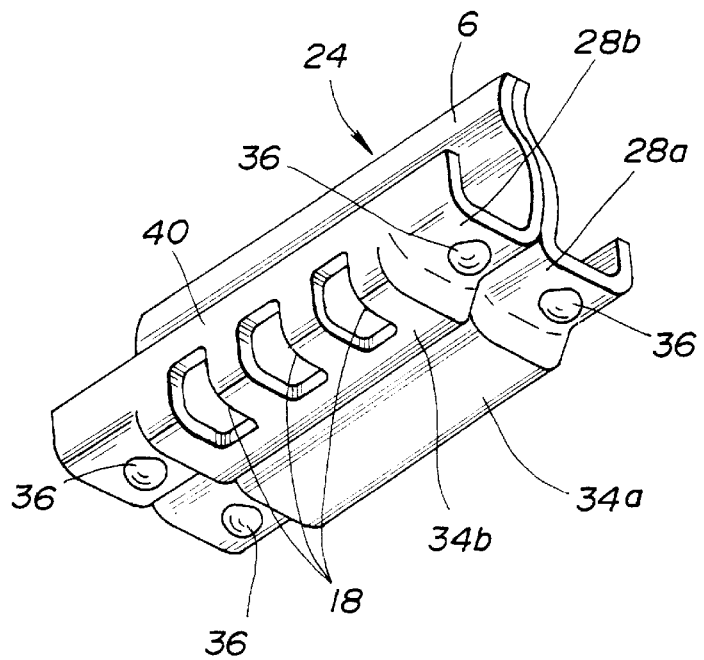
FIG. 11 is a perspective but partial view of a movable rail employed in the seat slide device of the second embodiment.

Referring to FIGS. 9 to 11, there is shown a rail unit 21B of an automotive seat slide device which is a second embodiment of the present invention.

Since the rail unit 21B of this second embodiment is similar to the above-mentioned rail unit 21A of the first embodiment, only portions and parts which are different from those of the first embodiment will be described in the following.

As is seen from FIG. 10, each side wall 29a or 29b of the fixed rail 3 is inclined outward, unlike the case of the first embodiment.

As is seen from FIG. 11, the two lower flanges 28a and 28b of the movable rail 24 are formed at mutually mating sections with depressed portions 34a and 34b respectively. The depressed portion 34b is formed with three aligned locking openings 18 with which the three pawls 16 of the latch plate 15 are engageable. Each lower flange 28a or 28b is formed at front and rear portions of the corresponding depressed portion 34a or 34b with respective semispherical bosses 36 which serve as stoppers for the rollers 25 as is understood from FIG. 9. The rollers 25 and balls 26 are rotatably retained by front and rear roller/ball retainers 31a and 31b which are slidably disposed between the fixed and movable rails 3 and 24.

Due to provision of the two depressed portions 34a and 34b, an apertured part 40 of the movable rail 24 where the three locking openings 18 are formed has a robust structure. Thus, the rail unit 21B of this second embodiment can exhibit a sufficient resistance against a marked stress applied thereto upon a vehicle collision or the like.

In the following, advantages of the rail unit 21B of the second embodiment will be described.

First, as is described hereinabove, due to the robust structure of the apertured part 40, undesired deformation of the apertured part 40 upon a vehicle collision, which tends to occur in the conventional seat slide device, is suppressed or at least minimized. In fact, due to provision of the depressed portions 34a and 34b, the modulus of section of the movable rail 24 is increased.

Second, due to provision of the two depressed portions 34a and 34b, the two lower flanges 28a and 28b of the movable rail 24 can instantly abut against the bottom surface 7 of the fixed rail 3 upon pivotal movement of the movable rail 24 caused by a vehicle collision or the like. The instant abutment can minimize the possibility of undesired separation of the movable rail 24 from the fixed rail 3.

Third, since the robust structure of the movable rail 24 is easily achieved by only pressing the same, the rail unit 21B of this embodiment can be produced low in cost and light in weight.

Figure 12:
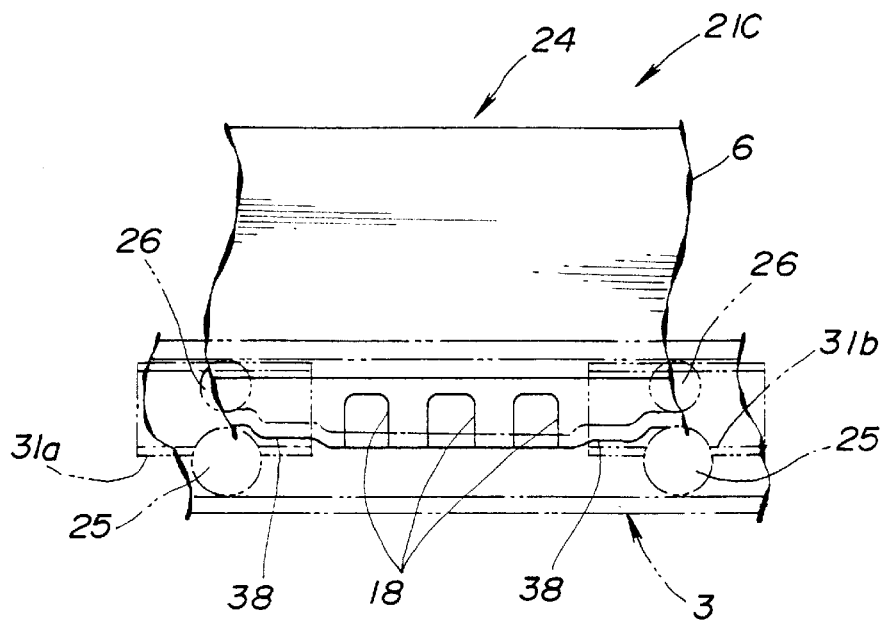
FIG. 12 is a view similar to FIG. 9, but showing a seat slide device of a third embodiment of the present invention.
Figure 13:
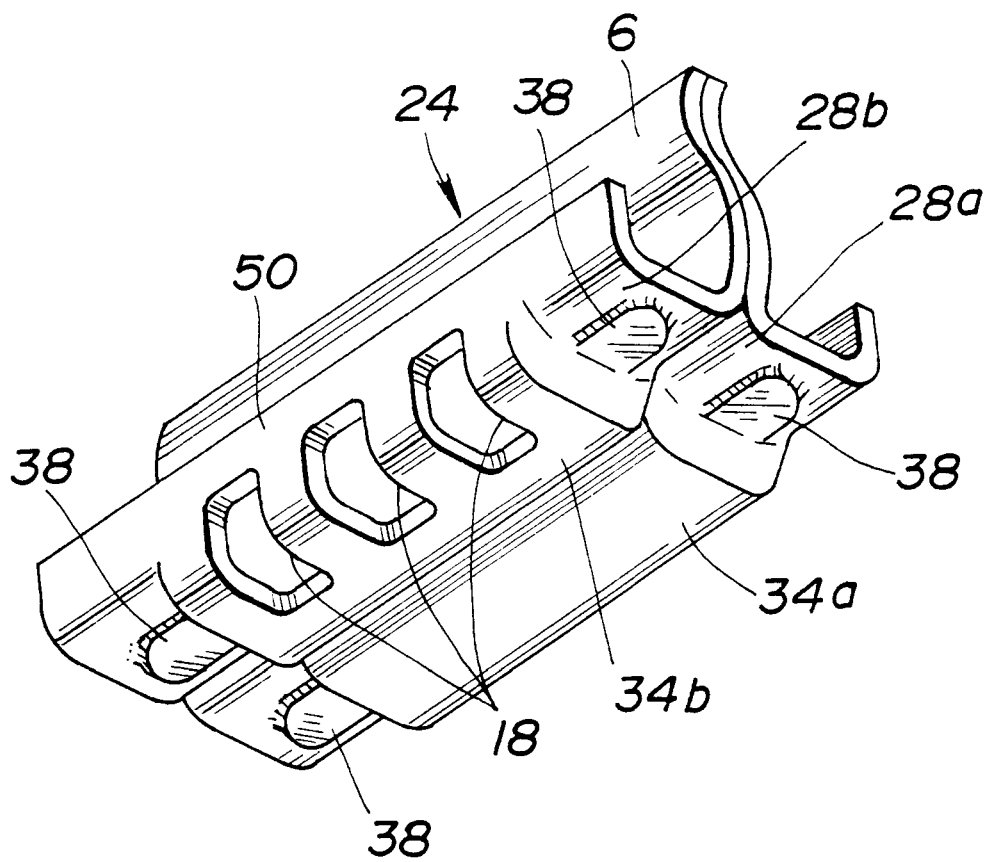
FIG. 13 is a perspective but partial view of a movable rail employed in the seat slide device of the third embodiment.
Figure 14:
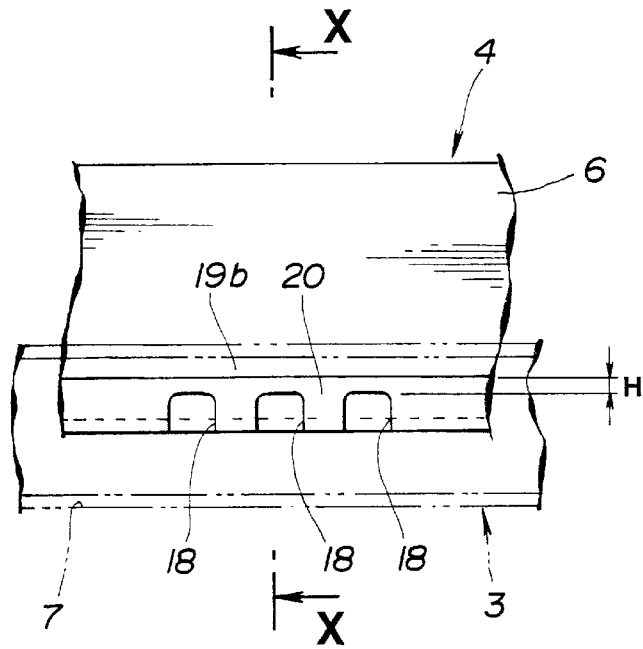
FIG. 14 is a view similar to FIG. 5, but showing a conventional seat slide device.
Figure 15:
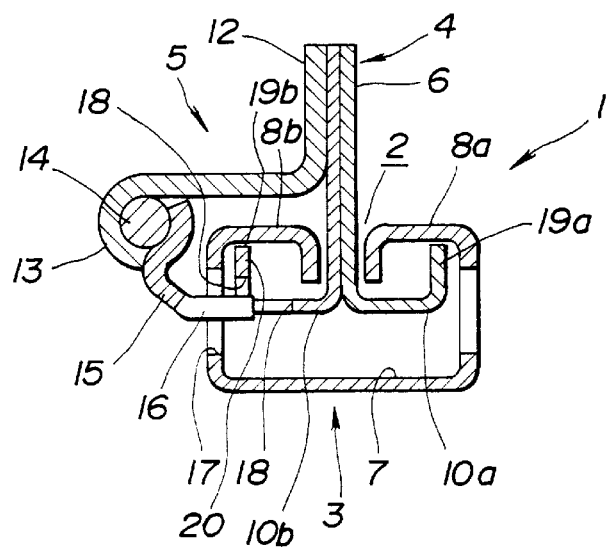
FIG. 15 is a sectional view taken along the line X—X of FIG. 14.
Figure 16:
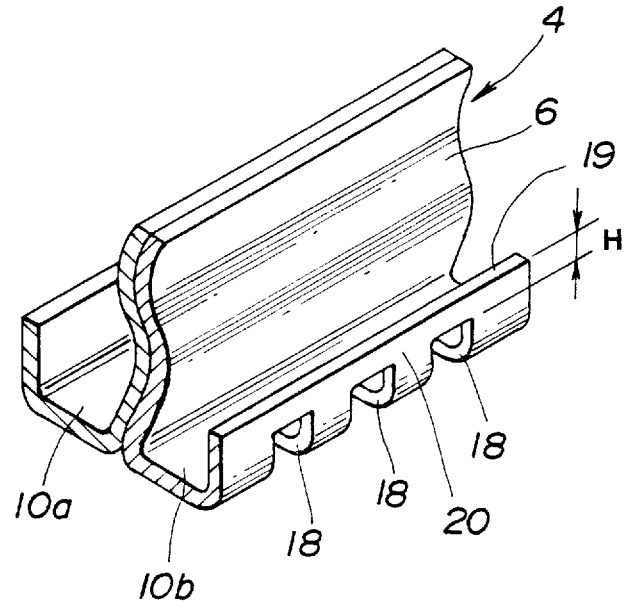
FIG. 16 is a perspective but partial view of a movable rail employed in the conventional seat slide device.
Figure 17:
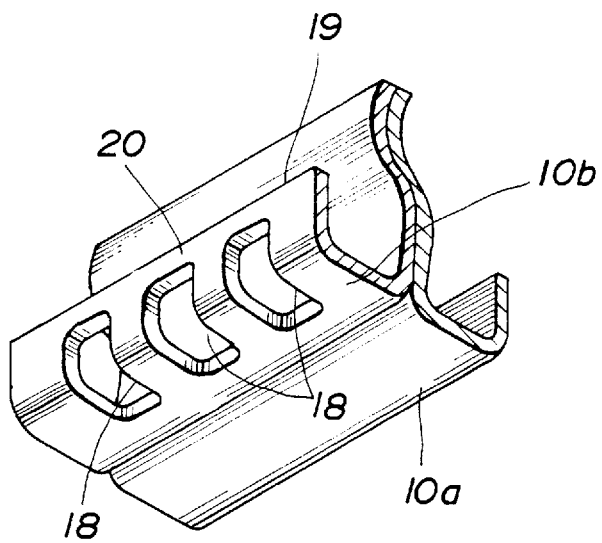
FIG. 17 is a perspective but partial view of the movable rail of the conventional seat slide device which is taken from a different position.

Referring to FIGS. 12 and 13, there is shown a rail unit 21C of an automotive seat slide device which is a third embodiment of the present invention.

Since the rail unit 21C of this third embodiment is similar to the above-mentioned rail unit 21B of the second embodiment, only portions which are different from those of the second embodiment will be described in the following.

As is seen from FIG. 13, each lower flange 28a or 28b of the movable rail 24 is formed at front and rear end portions of the corresponding depressed portion 34a or 34b with respective elongate bosses 38 which serve as stoppers for the rollers 25 as is understood from FIG. 12. Each elongate boss 38 extends from the corresponding depressed portion 34a or 34b.

Due to provision of the two depressed portions 34a and 34b, an apertured part 50 of the movable rail 24 where the three locking openings 18 are formed has a robust structure. In fact, due to the elongate bosses 38 integrated with the depressed portions 34a and 34b, the robust structure is much assured. Thus, the rail unit 21C of this third embodiment can exhibit a sufficient resistance against a marked stress applied thereto upon a vehicle collision or the like. The advantages of the second embodiment are also possessed by this third embodiment.

What is claimed is:

1. A seat slide device comprising:

a fixed rail having a substantially enclosed structure, said fixed rail including a bottom wall, side walls which extend upward from side ends of said bottom wall and two upper flanges which extend toward each other from upper ends of said side walls defining therebetween an axially extending slit;

a plurality of first aligned locking openings formed in one of said side walls of said fixed rail;

a movable rail including a vertical wall portion and two lower flanges extending in laterally opposite directions from a lower end of said vertical wall portion and have respective leading end portions bent upward, said movable rail being slidably engaged with said fixed rail in such a manner that said vertical wall portion is slidably put in said slit of said fixed rail having said two lower flanges slidably received in the enclosed structure of said fixed rail;

at least one second locking opening formed in a given portion of one of said two lower flanges of said movable rail, said second locking opening extending into the corresponding upwardly bent portion and being registered with one of said first locking openings when said movable rail assumes a certain position relative to said fixed rail;

a latch plate pivotally supported by said movable rail, said latch plate having at least one pawl which can be led into the registered first and second locking openings to lock said movable rail at the certain position relative to said fixed rail; and a reinforcing projected structure integrally formed with said lower flanges of said movable rail, said reinforcing projected structure being brought into abutment with one of upper and lower surfaces of an interior of the enclosed structure of said fixed rail when said fixed and movable rails are mutually displaced in directions to be pulled apart from one another;

wherein said reinforcing projected structure includes:
- a first depressed portion integrally formed with said given portion of one of said two lower flanges of said movable rail; and
- a second depressed portion integrally formed with a corresponding portion of the other of said two lower flanges of said movable rail.

2. A seat slide device as claimed in claim 1, in which said reinforcing projected structure is integrally possessed by said given portion of said movable rail.

3. A seat slide device as claimed in claim 1, in which each of the lower flanges of said movable rail is formed at front and rear portions of the corresponding depressed portion with respective bosses, each boss being one of semisherical and elongate in shape.

4. A seat slide device comprising:

a fixed rail having a substantially enclosed structure, said fixed rail including a bottom wall, side walls which extend upward from side ends of said bottom wall and two upper flanges which extend toward each other from upper ends of said side walls defining therebetween an axially extending slit;

a plurality of first aligned locking openings formed in one of said side walls of said fixed rail;

a movable rail including a vertical wall portion and two lower flanges extending in laterally opposite directions from a lower end of said vertical wall portion and have respective leading end portions bent upward, said movable rail being slidably engaged with said fixed rail in such a manner that said vertical wall portion is slidably put in said slit of the fixed rail having said two lower flanges slidably received in the enclosed structure of said fixed rail;

at least one second locking opening formed in a given portion of one of said two lower flanges of said movable rail, said second locking opening extending into the corresponding upwardly bent portion and being registered with one of said first locking openings when said movable rail assumes a certain position relative to said fixed rail;

a latch plate pivotally supported by said movable rail, said latch plate having at least one pawl which can be led into the registered first and second locking openings to lock said movable rail at the certain position relative to said fixed rail;

a plurality of rollers rotatably disposed at the bottom wall of said fixed rail to hold thereon the two lower flanges of said movable rail;

a plurality of balls rotatably received in a space defined between each of the two lower flanges of said movable rail and each of the two upper flanges of said fixed rail;

front and rear roller/bail retainers by which said rollers and balls are parted into two groups, each retainer being slidably disposed between said fixed and movable rails; and a reinforcing projected structure including a depressed portion integrally formed with said given portion of one of said two lower flanges of said movable rail and another depressed portion integrally formed with a corresponding portion of the other lower flange of said movable rail, said reinforcing projected structure being brought into abutment with a lower surface of an interior of the enclosed structure of said fixed rail when said fixed and movable rails are mutually displaced in directions to be pulled apart from one another.

* * * * *